(12) United States Patent
Clark

(10) Patent No.: US 8,191,755 B2
(45) Date of Patent: Jun. 5, 2012

(54) METHOD OF MANUFACTURING A ROTOR DISC

(75) Inventor: Brynley Clark, Bristol (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/043,840

(22) Filed: Mar. 9, 2011

(65) Prior Publication Data

US 2011/0240204 A1    Oct. 6, 2011

(30) Foreign Application Priority Data

Mar. 30, 2010  (GB) .................................. 1005270.2

(51) Int. Cl.
*B23K 20/00*  (2006.01)
*B23K 20/12*  (2006.01)
*B23P 15/04*  (2006.01)

(52) U.S. Cl. .................. 228/112.1; 228/193; 29/889.23

(58) Field of Classification Search .................. None
See application file for complete search history.

(56) References Cited

U.S. PATENT DOCUMENTS

| | | | | |
|---|---|---|---|---|
| 3,571,906 A * | 3/1971 | Barth et al. | .................. | 228/113 |
| 3,905,723 A * | 9/1975 | Torti, Jr. | .................. | 416/241 R |
| 4,096,615 A * | 6/1978 | Cross | .................. | 29/889.21 |
| 4,152,816 A * | 5/1979 | Ewing et al. | .................. | 29/889.2 |
| 4,247,259 A * | 1/1981 | Saboe et al. | .................. | 416/241 B |
| 4,270,256 A * | 6/1981 | Ewing | .................. | 29/889.21 |
| 4,529,452 A * | 7/1985 | Walker | .................. | 148/527 |
| 4,867,644 A * | 9/1989 | Wright et al. | .................. | 416/230 |
| 5,100,050 A * | 3/1992 | Krueger et al. | .................. | 228/265 |
| 5,106,012 A * | 4/1992 | Hyzak et al. | .................. | 228/265 |
| 5,113,583 A * | 5/1992 | Jenkel et al. | .................. | 29/889.21 |
| 5,148,965 A * | 9/1992 | Hayes et al. | .................. | 228/115 |
| 5,161,950 A * | 11/1992 | Krueger et al. | .................. | 416/204 R |
| 5,930,332 A * | 7/1999 | Eggleston et al. | .................. | 378/144 |
| 6,061,886 A * | 5/2000 | Nitta et al. | .................. | 29/23.51 |
| 6,164,917 A * | 12/2000 | Frasier et al. | .................. | 416/220 R |
| 6,247,638 B1 * | 6/2001 | Ress, Jr. | .................. | 228/193 |
| 2005/0103827 A1 * | 5/2005 | Twigg | .................. | 228/194 |
| 2005/0175840 A1 | 8/2005 | Giesler et al. | | |
| 2008/0030022 A1 * | 2/2008 | Twigg | .................. | 285/21.1 |
| 2008/0253894 A1 * | 10/2008 | Arrell et al. | .................. | 416/204 A |
| 2009/0304514 A1 * | 12/2009 | Izadi et al. | .................. | 416/213 R |

(Continued)

FOREIGN PATENT DOCUMENTS

EP    1 527 842 A1    5/2005

(Continued)

OTHER PUBLICATIONS

Search Report issued in corresponding British Application No. 1005270.2 dated Jul. 12, 2010.

*Primary Examiner* — Kiley Stoner
(74) *Attorney, Agent, or Firm* — Oliff & Berridge, PLC

(57) ABSTRACT

A method of manufacturing a composite rotor disc (2) in which, following diffusion bonding of a ceramic core section (4) of the rotor disc (2) to a metallic outer section (6) of the rotor disc (2) at an elevated temperature, the rotor disc (2) is allowed to cool to a predetermined temperature and is held at this predetermined temperature for a predetermined period of time. While the rotor disc (2) is held at this predetermined temperature it is loaded in a radially outward direction. The rotor disc (2) is then allowed to cool to a temperature below the predetermined temperature.

12 Claims, 3 Drawing Sheets

U.S. PATENT DOCUMENTS

2011/0076147 A1 * 3/2011 Ganesh et al. ............ 416/204 R

FOREIGN PATENT DOCUMENTS

| | | | |
|---|---|---|---|
| EP | 1 533 393 A2 | | 5/2005 |
| EP | 2 177 306 A1 | | 4/2010 |
| GB | 2063721 A | * | 6/1981 |
| GB | 2109274 A | * | 6/1983 |
| JP | A-11-047955 | | 2/1999 |

* cited by examiner

METHOD OF MANUFACTURING A ROTOR DISC

This invention relates to a method of manufacturing a composite rotor disc, and particularly, although not exclusively, a rotor disc for a compressor of a gas turbine engine.

A requirement of rotor discs, such as those used in compressors of gas turbine engines, is that they have a high strength and low weight. Traditionally, compressor rotor discs are manufactured from a single annular metallic forging, typically a titanium forging. However, to improve disc performance a wound block of ceramic fibre such as silicon carbon fibre may be diffusion bonded into the center of the rotor disc. The superior strength and stiffness of the ceramic fibre allows for the inner diameter of the rotor disc to be increased, thereby saving weight.

Methods for diffusion bonding ceramic fibres within a metal disc are disclosed in EP1527842 and EP1533393. Each method involves encasing a preformed ceramic fibre ring between two annular portions of a metal disc and applying a combination of heat and pressure which is sufficient to diffusion bond the ceramic fibre ring with the metal disc thereby forming a unitary composite rotor disc. Once diffusion bonding is complete the rotor disc is allowed to cool.

In general, the ceramic fibre ring has a lower coefficient of thermal expansion than the surrounding metal disc. Thus, when the metal disc and ceramic fibres are heated to the diffusion bonding temperature, the ceramic ring expands less than the metal disc. The metal disc and ceramic ring are diffusion bonded at this elevated temperature. When the bonded disc cools from the diffusion bonding temperature to room temperature, the metallic section of the rotor disc contracts more than the ceramic ring. Because the ceramic ring is encased in the metal section, contraction of the metal compresses the ceramic ring. At the same time the metallic section goes into tension about the ceramic ring. The rotor disc thus has locked-in tensile stress in the metallic section of the disc. Since the tensile stress is produced as a consequence of the metal and the ceramic being cooled to ambient temperature together, it is not possible to alleviate the tensile stress by thermal treatment.

Rotation of the rotor disc generates centrifugal loads on the disc. The loads increase the radial and circumferential tensile stresses within the disc which, for the metallic section of the disc, adds to the locked-in tensile stress. In operation, the temperature of the rotor disc usually increases. The greater thermal expansion of the metallic section with respect to the ceramic section thus alleviates some of the tensile stress locked into the rotor disc. Nevertheless, a significant amount of tensile stress will remain. Since the operating speed of a rotor disc is often limited by the amount of tensile stress the disc can withstand, the locked-in tensile stress prevents the disc from being operated at rotational speeds which would otherwise be possible.

According to the present invention there is provided a method of manufacturing a composite rotor disc comprising the steps of providing a rotor disc having a core section and an outer section, in which the core section has a coefficient of thermal expansion which is lower than the coefficient of thermal expansion of the outer section of the rotor disc, loading the rotor disc in a radially outward direction, while the rotor disc is held at a predetermined temperature, for a predetermined period of time and subsequently cooling the rotor disc to a temperature below the predetermined temperature.

The method may include a process in which the rotor disc is heated to an elevated temperature above the predetermined temperature and subsequently cooled, or allowed to cool, to ambient temperature, loading of the rotor disc being conducted while cooling of the rotor disc is arrested at the predetermined temperature, the predetermined temperature being sufficient to cause the material of the outer section to creep under the applied loading during the predetermined time. The process may be a diffusion bonding process in which the core section is bonded to the outer section.

The rotor disc may be annular, in which case the rotor disc may be loaded by applying a load to the radially inner surface of the rotor disc. For example, the load may be applied by expanding a segmented wedge ring against the radially inner surface. The applied load is that required to generate a hoop stress in the rotor which, when the rotor is held at the predetermined temperature for the predetermined period of time, is sufficient to cause a desired amount of creep. The hoop stress generated in the rotor may, for example, be not less than 200 MPa and not more than 600 MPa.

Alternatively, the rotor disc may be loaded by spinning the disc about its axis. The disc may be spun at not less than 3000 rpm and not more than 25000. The disc may, for example, be spun at not less than 8000 rpm.

The outer core may be fabricated from an alloy, for example a titanium alloy, in which case the predetermined temperature may be not less than 300° C. and may, for example, be not more than 550° C. The predetermined period of time may be not less than 3 hours and not more than 100 hours. The predetermined period of time may, for example, be not less than 3 hours and not more than 10 hours.

The core section may comprise silicon carbide fibres.

For a better understanding of the present invention, and to show more clearly how it may be carried into effect, reference will now be made, by way of example, to the following drawings, of which:

Figure 1:
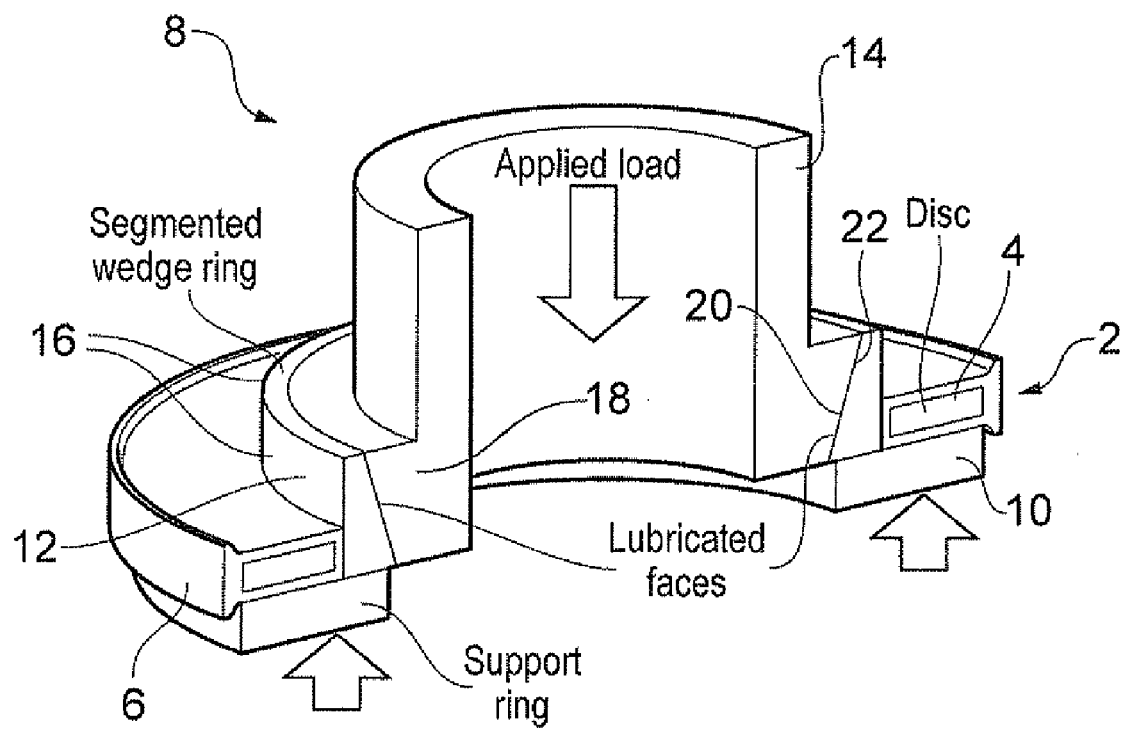
FIG. 1 is a partial perspective view of a rotor disc and an apparatus for applying a load to the rotor disc.

Referring to FIG. 1 an annular composite rotor disc 2 for a compressor is shown arranged on an expander 8.

The expander 8 comprises a support ring 10, a wedge ring 12 and a tubular plunger 14 arranged coaxially with the wedge ring 12. The wedge ring 12 comprises separate segments 16 which allow the wedge ring 12 to be expanded. The plunger 14 has a flange portion 18 at one end which engages with the radially inner surface 22 of the wedge ring 12. The outer surface 20 of the flange portion 18 and the inner surface 22 of the wedge ring 12 are inclined to the axial direction and arranged such that when a load is applied to the plunger 14 in an axial direction and against the wedge ring 12, a proportion of the load is transferred in a radial direction. The support ring 10 is disposed adjacent the wedge ring 12 to support the rotor disc 2 and to prevent axial displacement of the wedge ring 12 when a load is applied.

Figure 2:
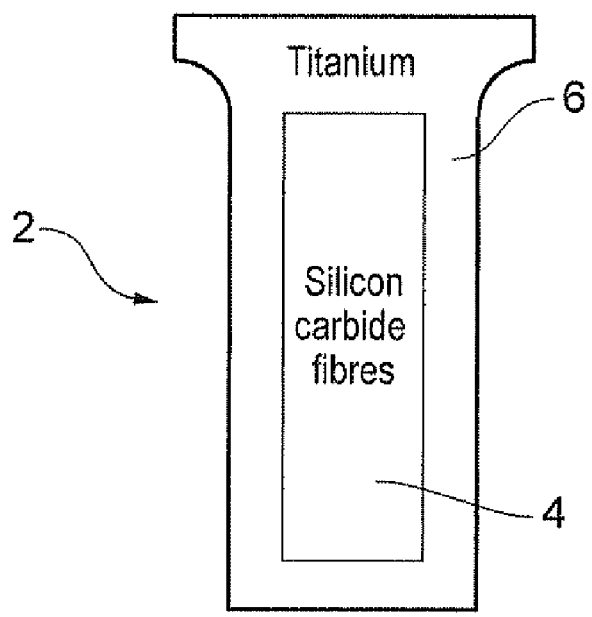
FIG. 2 is a partial sectional view of the rotor disc shown in FIG. 1.

With reference to FIG. 2 the composite rotor disc 2 has a core section 4 and an outer section 6. The core section 4 comprises a wound block of silicon carbide fibre. The outer section 6 is made from titanium. The core section 4 is encased in the outer section 6 and is diffusion bonded to the core section 4.

The diffusion bonding is carried out, for example, by hot isostatic pressing of the rotor disc 2, during which the rotor disc 2 is heated to a temperature in excess of 700° C.

Following the diffusion bonding process, the rotor disc 2, while still hot, is arranged on the expander 8, as shown in FIG. 1. The rotor disc 2 is then allowed to cool to a predetermined temperature. The predetermined temperature is not less than a temperature at which measurable creep will occur in the material of the outer section 6 when a load is applied. For many aerospace alloys, the predetermined temperature may be not less than 300° C. For example, for a titanium alloy a temperature of 550° C. is suitable. It will be appreciated that the diffusion bonding process could be carried out with the rotor disc 2 in situ on the expander 8.

Figure 3:
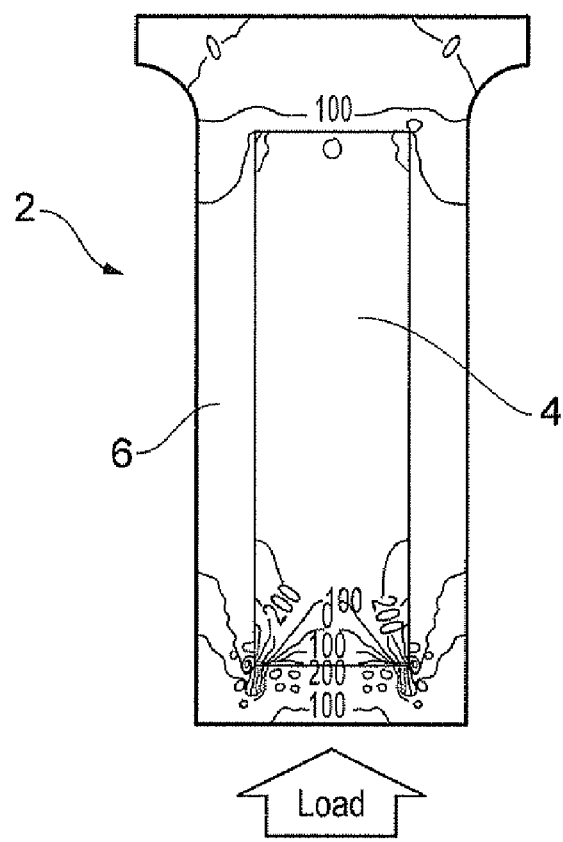
FIG. 3 is a partial sectional view of the rotor disc shown in FIG. 1 showing a representation of the stress distribution when the rotor disc is loaded radially.

Once the rotor disc 2 has cooled to the predetermined temperature, the cooling is arrested. The temperature of the rotor disc 2 is maintained for a predetermined period not less than 3 hours. The temperature may be maintained by placing the expander 8 and the rotor disc 2 within an oven or an insulated chamber. It will be appreciated that any suitable means for maintaining the temperature of the rotor disc 2 could be employed. While the rotor disc 2 is maintained at the predetermined temperature, an axial load is applied to the plunger 14 to expand the wedge ring 12 against the radially inner surface of the rotor disc 2 thereby exerting a load on the rotor disc 2 in a radially outward direction. The axial load applied to the plunger is approximately 30 kN. The arrangement of the wedge ring 12 and the rotor disc 2 is such that the hoop stress generated in the rotor disc 2 when the load is applied is not less than 200 MPa and not more than 600 MPa. An example of the hoop stress distribution in the radial plane of the rotor disc 2 when the load is applied is shown in FIG. 3.

Figure 4:
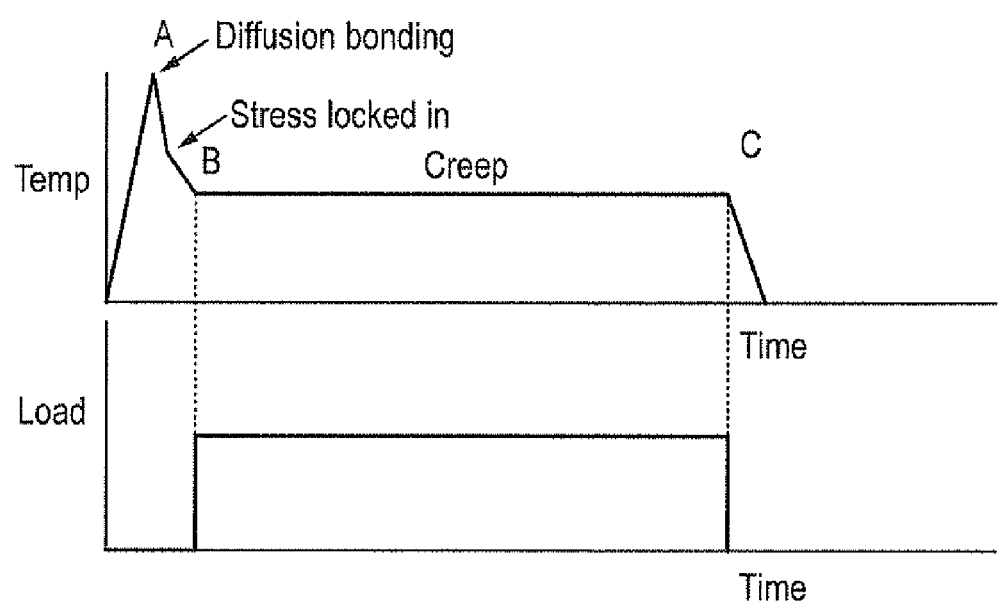
FIG. 4 is a graphical illustration of a bonding and cooling process.

An illustration of the heating/cooling and loading cycle applied to the rotor disc 2 is shown in FIG. 4. The rotor disc 2 is heated relatively rapidly to the diffusion bonding temperature at point A, then allowed to cool. At point B, cooling is arrested, and the temperature is maintained until point C, after which cooling to ambient temperature is allowed to continue. The constant load is applied from point B to point C.

The load increases the tensile stress in the rotor disc 2 causing the titanium outer section 6 to creep. The amount of creep which occurs in the silicon core section 4 is significantly less than the amount of creep which occurs in the titanium outer section 6. The amount of creep will increase over time and will be dependent on the temperature at which the load is applied and the magnitude of the applied load. It will therefore be appreciated that a higher temperature and/or an increased applied load will shorten the time required to achieve a desired amount of creep. The desired amount of creep will depend on the target design life of the rotor disc and the duty cycle the rotor disc will experience in use.

Once the predetermined period of time has lapsed the load is removed from the plunger 14 and the rotor disc 2 is allowed to cool below the predetermined temperature to a cold condition, for example to the ambient temperature. The creep strain introduced during loading is locked into the outer section 6 during this further cooling process. Consequently, the tensile stress which is ordinarily generated in the outer section 6 when the rotor disc 2 is cooled below the predetermined temperature is offset by the locked-in creep strain. The effect of the locked-in creep strain is thus to reduce the tensile stress in the outer section 6 in the cold condition.

Figure 5:
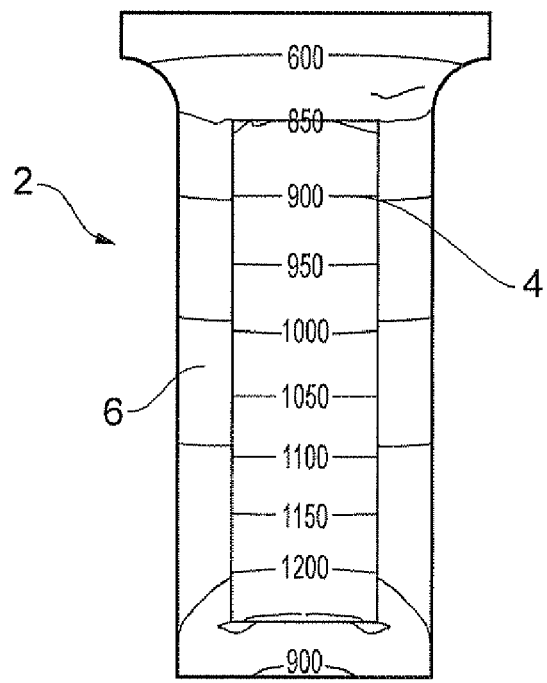
FIG. 5 is a partial sectional view of the compressor disc showing a representation of the stress distribution of a rotor disc manufactured using known methods when in operation.
Figure 6:
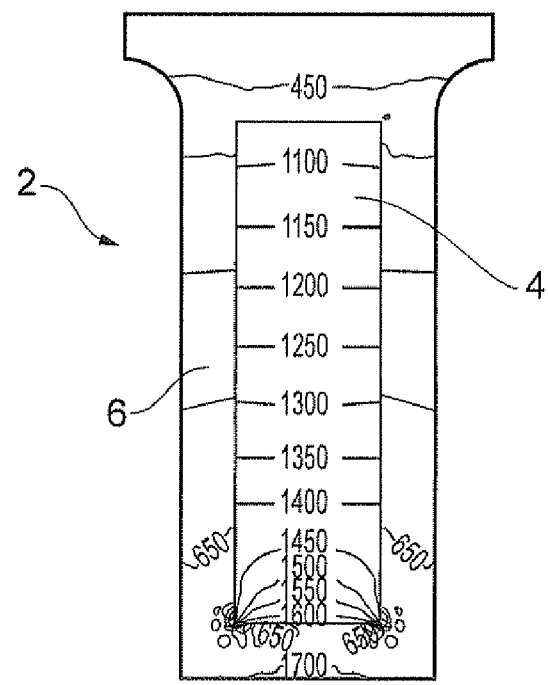
FIG. 6 is a partial sectional view of the compressor disc showing a representation of the stress distribution of a rotor disc manufactured in accordance with the invention when in operation.

Consequently, when the rotor disc 2 is rotated in use, the centrifugal stress in the titanium outer section 6 will be less than that in rotor discs without the locked-in creep strain. Examples of stress distributions in the radial plane of a conventionally manufactured rotor disc and a rotor disc manufactured in accordance with the above method are shown respectively in FIGS. 5 and 6. Although the stresses in the core section 4 will be greater than in rotor discs in which creep strain is not locked into the outer section 6, this is preferable since the silicon carbide has a greater strength and so can tolerate the increased stress. Alleviation of the tensile stress in the outer section 6 reduces the required strength of the rotor disc 2 for a particular rotational speed, thus allowing more lightweight discs to be used.

It will be appreciated that the amount of creep is dependent on the material type and creep process parameters. A particular type of material will have its own creep characteristics. The creep process parameters include the temperature of the material, the stress level in the material and the duration of the creep process. Consequently, the desired amount of creep for a particular material can be generated by careful optimisation of all the creep process parameters.

Figure 7:
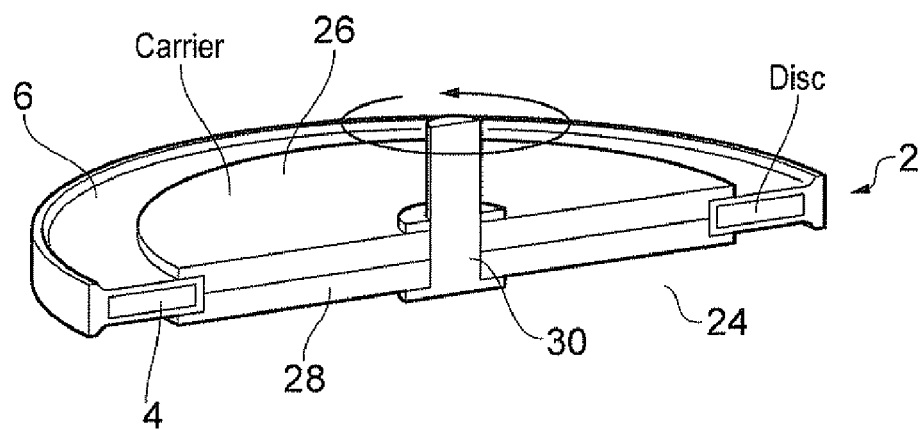
FIG. 7 is a partial perspective view of a rotor disc and an apparatus for loading the rotor disc.

FIG. 7 shows the rotor disc 2 carried by a carrier 24 for loading the rotor disc 2. The carrier comprises circular plates 26, 28 between which the rotor disc 2 is clamped. The plates 26, 28 are mounted to a rotary shaft 30. The rotor disc 2 is loaded by rotating the carrier 24, and hence the rotor disc 2, at not less than 8000 rpm. The centrifugal forces acting on the rotor disc 2 load the outer section 6 of the rotor disc 2 so that when the rotor disc 2 is held at the predetermined temperature for the predetermined period of time (described previously) creep occurs in the outer section 6. It will be appreciated that the stress generated within the spinning rotor disc 2 will depend on the rotational speed and geometry of the rotor disc 2. For example, to achieve a desired amount of creep using particular creep process parameters, a large fan disc may be spun at 3000 rpm whereas a small high pressure compressor disc (e.g. for a helicopter engine) may be spun at 25000 rpm. The tensile stress distribution in the outer section 6 generated by spinning the rotor disc 2 replicates the stresses in the rotor disc 2 during operation. Dissipation of the tensile stresses by allowing the rotor disc 2 to creep whilst being spun before the rotor disc 2 is allowed to cool will thus create a locked-in creep strain which is particularly effective at alleviating the tensile stresses in the rotor disc 2 during subsequent operation.

It will be appreciated that although the above methods are described as being performed by arresting the cooling process following diffusion bonding, the methods may also be performed on a pre-bonded rotor disc by heating the rotor disc to the predetermined temperature and maintaining the rotor disc at the predetermined temperature while the rotor disc is loaded.

It is envisaged that optimum treatment of a rotor disc may be achieved by variation of the load and/or the temperature over time.

It will be further appreciated that although the above method has been described in respect of ceramic cores and metallic outer sections, the method and apparatus could be used in respect of rotor discs in which the core section is fabricated from any suitable material having a coefficient of thermal expansion which is lower than the coefficient of thermal expansion of the outer section. A rotor disc comprising steel, nickel alloys or aluminium may be used, wherein each material will have its own creep characteristics. It will also be appreciated that the method could be applied to rotor discs in which the core section is not completely encased in the outer section.

In the exemplary methods described above, the predetermined period of time does not exceed 100 hours. A predetermined period in excess of this could be used, but this is unlikely owing to the cost of performing a process lasting many days.

The invention claimed is:

1. A method of manufacturing a composite rotor disc comprising the steps of;
   providing a rotor disc having a core section and an outer section, in which the core section has a coefficient of thermal expansion which is lower than the coefficient of thermal expansion of the outer section;
   loading the rotor disc in a radially outward direction, while the rotor disc is held at a predetermined temperature, for a predetermined period of time;
   and subsequently cooling the rotor disc to a temperature below the predetermined temperature.

2. A method as claimed in claim 1 in which the rotor disc is heated to an elevated temperature above the predetermined temperature and subsequently cooled, or allowed to cool, to ambient temperature, loading of the rotor disc being conducted while cooling of the rotor disc is arrested at the predetermined temperature, the predetermined temperature being sufficient to cause the material of the outer section to creep under the applied loading during the predetermined time.

3. A method as claimed in claim 2 in which the core section is diffusion bonded to the outer section.

4. A method as claimed in claim 1 in which the rotor disc is annular and the rotor disc is loaded by applying a load to the radially inner surface of the rotor disc.

5. A method as claimed in claim 1 in which in which the rotor disc is annular and a load is applied to the radially inner surface of the rotor disc by expanding a segmented wedge ring against the radially inner surface.

6. A method as claimed in claim 4 in which the applied load generates a hoop stress in the rotor disc which is not less than 200 MPa and not more than 600 MPa.

7. A method as claimed in claim 1 in which the rotor disc is loaded by spinning the disc about its axis.

8. A method as claimed in claim 1 in which the rotor disc is loaded by spinning the disc about its axis at not less than 3000 rpm and not more than 25000 rpm.

9. A method as claimed in claim 1 in which the outer core is titanium, or titanium alloy, and the predetermined temperature is not less than 300° C.

10. A method as claimed in claim 1 in which the outer core is titanium, or titanium alloy, and the predetermined temperature is not more than 550° C.

11. A method as claimed in claim 1 in which the predetermined period of time is not less than 3 hours and not more than 100 hours.

12. A method as claimed in claim 1 in which the core section comprises silicon carbide fibres.

* * * * *